United States Patent
Zhou et al.

(10) Patent No.: US 11,247,701 B2
(45) Date of Patent: Feb. 15, 2022

(54) SMART MOVING DEVICE, NAVIGATION METHOD THEREOF, AND STORAGE MEDIUM

(71) Applicant: TENCENT TECHNOLOGY (SHENZHEN) COMPANY LIMITED, Guangdong (CN)

(72) Inventors: Wei Zhou, Shenzhen (CN); Wei Wu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 91 days.

(21) Appl. No.: 16/874,854

(22) Filed: May 15, 2020

(65) Prior Publication Data
US 2020/0276985 A1    Sep. 3, 2020

Related U.S. Application Data (63) Continuation of application No. PCT/CN2019/073876, filed on Jan. 30, 2019.

(30) Foreign Application Priority Data

Feb. 5, 2018   (CN) .......................... 201810114185.7

(51) Int. Cl.
*B60W 60/00*    (2020.01)
*B60W 30/095*   (2012.01)
*G01C 21/34*    (2006.01)

(52) U.S. Cl.
CPC .... *B60W 60/0011* (2020.02); *B60W 30/0956* (2013.01); *G01C 21/3453* (2013.01)

(58) Field of Classification Search
CPC .. G05D 1/0214; G05D 1/0088; G05D 1/0212; B60W 30/09; G06K 9/00805; G08G 1/166; G08G 1/165
See application file for complete search history.

(56) References Cited

U.S. PATENT DOCUMENTS

| 5,006,988 A | 4/1991 | Borenstein et al. |
| 2002/0198632 A1 | 12/2002 | Breed et al. |

(Continued)

FOREIGN PATENT DOCUMENTS

| CN | 101126645 A | 2/2008 |
| CN | 102288191 A | 12/2011 |

(Continued)

OTHER PUBLICATIONS

P. Long et al., "Deep-Learned Collision Avoidance Policy for Distributed Multiagent Navigation", IEEE Robotics and Automation Letters, vol. 2, No. 2, Apr. 2017, pp. 656-663 (8 Pages Total).

(Continued)

*Primary Examiner* — Ryan Rink
(74) *Attorney, Agent, or Firm* — Sughrue Mion, PLLC (57) ABSTRACT

A navigation method, performed by a smart moving device, includes determining a navigation strategy according to a preset navigation calculation function; acquiring collision indication information related to a collision status when the smart moving device moves according to the navigation strategy; and adjusting the preset navigation calculation function according to the collision indication information; and updating the navigation strategy according to the adjusted navigation calculation function.

16 Claims, 4 Drawing Sheets

(56) References Cited

U.S. PATENT DOCUMENTS

| | | | |
|---|---|---|---|
| 2006/0293856 A1* | 12/2006 | Foessel | G01S 13/931 701/301 |
| 2008/0027591 A1* | 1/2008 | Lenser | G05D 1/0251 701/2 |
| 2013/0103249 A1 | 4/2013 | Pieper et al. | |
| 2014/0277718 A1* | 9/2014 | Izhikevich | B25J 9/161 700/250 |
| 2017/0269594 A1 | 9/2017 | Sydnor | |
| 2018/0032082 A1* | 2/2018 | Shalev-Shwartz | G06N 7/005 |
| 2019/0163191 A1* | 5/2019 | Sorin | G05D 1/0088 |
| 2019/0217857 A1* | 7/2019 | Sorin | B60W 30/09 |

FOREIGN PATENT DOCUMENTS

| | | |
|---|---|---|
| CN | 103400392 A | 11/2013 |
| CN | 103777639 A | 5/2014 |
| CN | 103926925 A | 7/2014 |
| CN | 104050390 A | 9/2014 |
| CN | 105094124 A | 11/2015 |
| CN | 105116902 A | 12/2015 |
| CN | 105629970 A | 6/2016 |
| CN | 105652876 A | 6/2016 |
| CN | 106598055 A | 4/2017 |
| CN | 106774310 A | 5/2017 |
| CN | 107168319 A | 9/2017 |
| CN | 107168337 A | 9/2017 |
| CN | 107479547 A | 12/2017 |
| CN | 108363393 A | 8/2018 |

OTHER PUBLICATIONS

Communication dated Mar. 18, 2021, from the European Patent Office in European Application No. 19746962.0.
Written Opinion dated May 7, 2019 from the International Bureau in International Application No. PCT/CN2019/073876.
Communication dated Mar. 1, 2021, from the European Patent Office in European Application No. 19746962.0.
Chinese Office Action issued in CN 201810114185.7 dated May 27, 2019.
International Search Report for PCT/CN2019/073876 dated May 7, 2019 (PCT/ISA/210).

* cited by examiner

SMART MOVING DEVICE, NAVIGATION METHOD THEREOF, AND STORAGE MEDIUM

CROSS-REFERENCE TO RELATED APPLICATION(S)

This application is a bypass continuation application of International Application No. PCT/CN2019/073876, filed with the Chinese Patent Office on Jan. 30, 2019, which claims priority to Chinese Patent Application No. 201810114185.7, filed with the Chinese Patent Office on Feb. 5, 2018 and entitled "smart moving device, navigation method thereof, and storage medium", the disclosures of which are herein incorporated by reference in their entireties.

FIELD

Example embodiments of the disclosure relate to the field of information processing technologies, and in particular, to a smart moving device, a navigation method thereof, and a storage medium.

BACKGROUND

A smart moving device is a device that moves forward, moves backward, rotates or makes any other movement in various environments according to a preset navigation method, and is, for example, a robot or an unmanned vehicle. An existing navigation method of a smart moving device mainly includes the following operations:

A movable area of an environment in which a smart moving device is located is acquired, and the speed of the smart moving device is periodically sampled to obtain a series of sampled speeds. A trajectory of the smart moving device at a series of sampled speeds within a particular time is then simulated, and a speed corresponding to an optimal trajectory along which the smart moving device does not collide is chosen to drive the smart moving device to move. In an existing navigation method, an environment in which a smart moving device is located is mainly modeled first to acquire a movable area, and the smart moving device is modeled. As soon as a model is established, the movement of the smart moving device is fixed in a particular environment.

However, in practice, the movement of a smart moving device is not ideal. A condition such as load, component aging or motor heat dissipation of the smart moving device and interference from a physical environment in which the smart moving device is located, for example, ground friction, skidding or the like caused by a ground material, leads to uncertainty in the movement of the smart moving device based on the existing navigation method. As a result, the smart moving device still collides in a modeled specific environment.

SUMMARY

One or more example embodiments of the disclosure provide a smart moving device, a navigation method thereof, and a storage medium, in which a navigation strategy is adjusted according to collision indication information acquired by the smart moving device during movement.

In accordance with an example embodiment, there is provided a navigation method performed by a smart moving device, the navigation method including: determining a navigation strategy according to a preset navigation calculation function; acquiring collision indication information related to a collision status when the smart moving device moves according to the navigation strategy; and adjusting the preset navigation calculation function according to the collision indication information; and updating the navigation strategy according to the adjusted navigation calculation function.

In accordance with an example embodiment, there is provided a smart moving device, including: at least one memory configured to store program code; and at least one processor configured to read the program code and operate as instructed by the program code, the program code including: navigation determination code configured to cause at least one of the at least one processor to determine a navigation strategy according to a preset navigation calculation function; indication acquisition code configured to cause at least one of the at least one processor to acquire collision indication information related to a collision status when the smart moving device moves according to the navigation strategy; adjustment code configured to cause at least one of the at least one processor to adjust the preset navigation calculation function according to the collision indication information; and updating code configured to update the navigation strategy according to the adjusted navigation calculation function.

In accordance with an example embodiment, there is provided a non-transitory storage medium, the storage medium storing a plurality of instructions to be loaded by at least one processor to perform a navigation method, performed by a smart moving device, the navigation method including: determining a navigation strategy according to a preset navigation calculation function; acquiring collision indication information related to a collision status when the smart moving device moves according to the navigation strategy; adjusting the preset navigation calculation function according to the collision indication information; and updating the navigation strategy according to the adjusted navigation calculation function.

BRIEF DESCRIPTION OF THE DRAWINGS

The above and other aspects and features of the disclosure will become more apparent by describing in detail example embodiments thereof with reference to the attached drawings.

DETAILED DESCRIPTION

The technical solutions in the example embodiments of the disclosure are clearly described in the following with reference to the accompanying drawings. Apparently, the example embodiments to be described are merely a part rather than all of the embodiments of the disclosure. All other embodiments obtained by persons of ordinary skill in the art based on the example embodiments of the disclosure without making creative efforts shall fall within the protection scope of the disclosure.

In the specification, claims, and accompanying drawings of the disclosure, the terms "first", "second", "third", "fourth", and the like (if existing) are intended to distinguish between similar objects rather than describe a specific sequence or a precedence order. The data termed in such a way are interchangeable in proper circumstances, so that the embodiments of the disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

An example embodiment of the disclosure provides a navigation method of a smart moving device, mainly applied to the navigation for the forward movement, backward movement or rotation of a smart moving device. The smart moving device may be a device such as a robot or an unmanned vehicle. Specifically, the smart moving device may implement navigation by using the following method:

determining a navigation strategy of the smart moving device according to a preset navigation calculation function; acquiring collision indication information of the smart moving device in a case that the smart moving device moves according to the navigation strategy; and adjusting the navigation calculation function according to the collision indication information, so that the smart moving device determines the navigation strategy according to the adjusted navigation calculation function.

In this way, during movement according to a navigation strategy determined by using a preset navigation calculation function, a smart moving device may continuously adjust the navigation calculation function according to a collision status of the smart moving device, so that eventually, after the navigation strategy is determined by using the adjusted navigation calculation function, there is no collision or a very few collisions during movement according to the determined navigation strategy. The method in an example of the disclosure is applicable to a smart moving device having any navigation calculation function and is applicable to the movement of the smart moving device in any environment.

Figure 1:
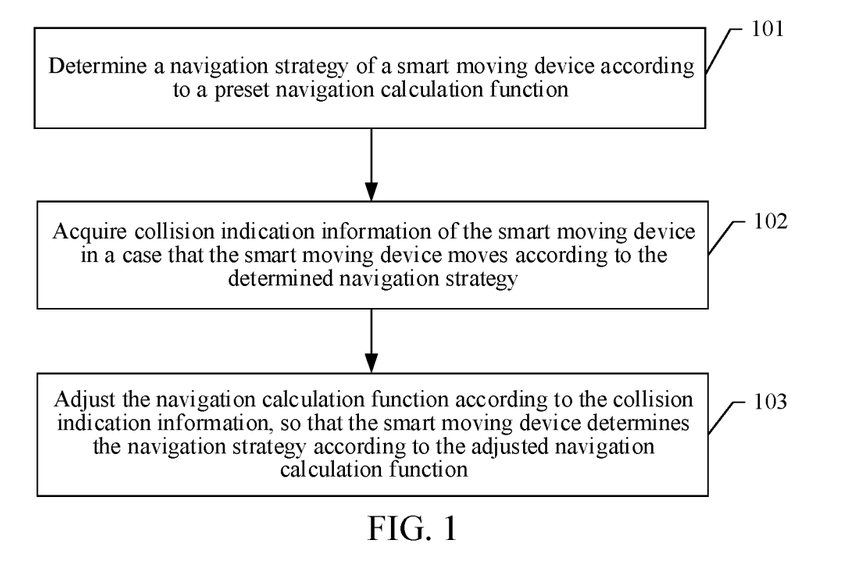
FIG. 1 is a flowchart of a navigation method of a smart moving device according to an example embodiment of the disclosure.

An example embodiment of the disclosure provides a navigation method of a smart moving device. The method may be performed by a smart moving device. A flowchart of the method is shown in FIG. 1, and the method includes the following operation:

Operation 101: Determine a navigation strategy of the smart moving device according to a preset navigation calculation function.

It may be understood that the smart moving device may initiate a procedure in an example embodiment according to a particular period. Specifically, the smart moving device may acquire, according to the particular period, environmental information of an environment in which the smart moving device is located, and determine the navigation strategy of the smart moving device according to the acquired environmental information and the preset navigation calculation function.

The environmental information is mainly used for representing whether positions in an environment at a distance from the smart moving device being within a preset range are occupied by obstacles. The obstacles in the environment may include a still obstacle and a moving obstacle. The still obstacle is a physical object that is not in movement, and may be obtained by combining a current position of the smart moving device and a map database of the current position. The current position is determined by a positioning apparatus included in the smart moving device. The moving obstacle is a physical object that appears temporarily or a moving object (for example, a pedestrian or a moving vehicle), and is obtained through scanning by a visual sensor or laser sensor included in the smart moving device.

Herein, the visual sensor or laser sensor may perform scanning with a particular frequency, to obtain position information (for example, environmental coordinate information) of positions and information about whether the positions are occupied by obstacles in the environment at a distance from the smart moving device being within the particular range.

The environmental information may include a correspondence between environmental coordinate information and obstacle occupation information. During actual application, the correspondence may be represented by a cost array. The cost array includes a plurality of element values. These element values are mainly values between 0 and 2, where 0 represents that there is no obstacle at a corresponding position, 1 represents that a corresponding position is occupied by an obstacle, and 2 represents that a corresponding position is an unknown space. That is, according to the element value of 2, an obstacle status at a corresponding position is still not acquired, and it is unclear whether the corresponding position is occupied by an obstacle. Position information of each element in the cost array may correspondingly represent environmental coordinate information of one position in the environment. In this way, an element value at any position in the cost array may indicate whether a position in the environment of the smart moving devices occupied by an obstacle.

For example, a cost array may be represented by a matrix of n×n, and may be, for example, $$\begin{bmatrix} 0, 0, 0, 0, 1 \\ 1, 0, 0, 0, 1 \\ 1, 0, 1, 0, 1 \\ 1, 0, 0, 0, 2 \\ 1, 1, 0, 0, 1 \end{bmatrix}.$$

The element value at the position represented by (1, 5) in the cost array is 1, representing that the position represented by (1, 5) in a current environment is occupied by an obstacle. (1, 5) in the cost array represents the position at the first row and the fifth column in the cost array. The element value at the position represented by (1, 1) is 0, representing that there is no obstacle at the position represented by (1, 1) in the current environment. The element value at the position represented by (4, 5) is 2, representing that information about whether the position represented by (4, 5) in the current environment is occupied by an obstacle is still not acquired.

The navigation strategy may vary according to different actual applications. For example, the smart moving device is a relatively simple robot. The movement of the smart moving device only needs to be directly driven by an internal processor in the smart moving device. The navigation strategy may mainly include information about a navigation direction such as moving forward, moving to the left front, moving to the right front, turning left, turning right, moving backward, moving to the left rear or moving to the right rear. A specific speed value of movement along a straight line and a specific speed value of rotation of the smart moving device are constant, and may be preset in the smart moving device.

In another example, the smart moving device is a relatively complex unmanned vehicle. In this case, the movement of the smart moving device needs to be driven by means of combined operations of a plurality of components included in the smart moving device. The determined navigation strategy may mainly include information such as a throttle operation, a braking operation, turning the steering wheel to the left or turning the steering wheel to the right for performing navigation driving on the smart moving device.

In addition, the preset navigation calculation function may be preset in the smart moving device, and may include, but is not limited to, the following two manners:

(1) The preset navigation calculation function includes: obtaining a navigation strategy indication value based on a product of multiplying the cost array (representing the environmental information) by one or more weights included in weight information.

Herein, the navigation strategy indication value is information indicating the navigation direction or information used for instructing to perform navigation driving on the smart moving device. For example, the navigation strategy indication value may be a one-dimensional array having eight elements, and indicate information about moving forward, moving to the left front, moving to the right front, turning left, turning right, moving backward, moving to the left rear, and moving to the right rear, respectively. For example, the navigation strategy indication value of [0, 1, 0, 0, 0, 0, 0, 0] may indicate information about moving to the left front. That is, the value of '1' of an element in the one-dimensional array indicates movement of the smart moving device in a direction assigned to the element.

The weight information may include a plurality of weight values. A number of the weight values is based on the dimension or the like of the cost array. For example, the cost array is a matrix 1 of n×n, so that the weight information may be a matrix 2 of n×1, and each element in the matrix 2 is one weight value. One navigation strategy corresponds to one or more weight values.

In this way, when performing this operation, the smart moving device may first calculate the navigation strategy indication value according to the acquired environmental information (which may be represented by the cost array) and the preset navigation calculation function, and then determine the navigation strategy of the smart moving device according to the navigation strategy indication value.

(2) The preset navigation calculation function includes: a first long-term expectation is a sum of current reward information and a weighting value of a second long-term expectation. In the use of the navigation calculation function, the first long-term expectation is a long-term expectation that the smart moving device performs a navigation strategy $c_i$ in current environmental information $s1$, and may be denoted as $Q_{c_i}(s1)$. The current reward information is used for representing a feedback generated after the smart moving device performs a navigation strategy $c_i$ in the current environmental information $s1$. The feedback is a collision feedback and is denoted as $Rc_i|s1$. The second long-term expectation is a long-term expectation that the smart moving device performs a navigation strategy $c_i$ in estimated environmental information $s$, and may be denoted as $Q_{c_i}(s)$. The long-term expectation is an expectation that a navigation strategy is performed without any collision. When a long-term expectation of a navigation strategy is larger, a collision is less likely to occur in the execution of the navigation strategy. The preset navigation calculation function may include the following Formula 1:

$$Q_{c_i}(s1) = Rc_i|s1 + r \times Q_{c_i}(s) \qquad (1)$$

The current environmental information $s1$ is environmental information acquired by the smart moving device being within a calculation period (that is, a current calculation period) of a currently initiated navigation strategy. The estimated environmental information $s$ is environmental information, within at least one subsequent calculation period (that is, a calculation period for determining the navigation strategy), estimated by the smart moving device, may be estimated according to the duration of the calculation period and a navigation strategy, and may be environmental information estimated within one or more calculation periods after the current calculation period. The weighting value of the second long-term expectation is a product of multiplying the second long-term expectation by a corresponding weight $r$. The weight $r$ may be an attenuation coefficient between 0 and 1.

$Rc_i|s1$ (that is, the current reward information) in the foregoing Formula 1 is an R value in the case of $c_i|s1$, and is obtained from a preset feedback model. The feedback model includes an R value (that is, reward information) of performing any navigation strategy in any piece of environmental information. The R value may be randomly chosen to initially determine the navigation strategy according to Formula 1. The R value may be obtained according to a sensor included in the smart moving device. For example, in a case that a collision sensor of the smart moving device detects collision with an obstacle, R may be −2. In another example, in a case that the laser sensor or visual sensor is used to detect that the smart moving device is approaching an obstacle (that is, the smart moving device is moving toward an obstacle and a distance from the obstacle is less than a value), R may be −1. In another example, in a case that it is detected that the smart moving device is leaving an obstacle (that is, the smart moving device is moving away from an obstacle and a distance from the obstacle is greater than a value), R may be 2.

In this way, when performing this operation, the smart moving device may first calculate, according to the acquired environmental information and the preset navigation calculation function, a plurality of first long-term expectation values that separately correspond to a plurality of navigation strategies; and select the largest value in the plurality of first long-term expectation values, and determining a navigation strategy corresponding to the chosen largest value as the navigation strategy of the smart moving device.

A navigation strategy is a navigation direction, for example, information about moving forward, moving to the left front, moving to the right front, turning left, turning right, moving backward, moving to the left rear or moving to the right rear. Alternatively, a navigation strategy is information for performing navigation driving on the smart moving device to enable the smart moving device to move in a direction.

The navigation method of the smart moving device according to an example embodiment of FIG. 1 may further include:

Operation 102: Acquire collision indication information of the smart moving device in a case that the smart moving device moves according to the navigation strategy determined in operation 101, the collision indication information indicating whether the smart moving device is colliding with an obstacle in an environment.

The smart moving device may include a collision sensor. The collision sensor includes an inner contact point and an outer contact point. The inner contact point may be disposed at the bottom of the smart moving device, and the outer contact point may be disposed at a layer of rubber stripe at the bottom of the smart moving device. The rubber stripe is elastic. In a case that the smart moving device is not colliding with any obstacle, the inner contact point and the outer contact point are not in contact, and a signal sensed by the collision sensor may be a negative value. In a case that the smart moving device is colliding with an obstacle, the rubber stripe at the bottom of the smart moving device deforms to enable the inner contact point to contact the outer contact point, and in this case the signal sensed by the collision sensor turns into a positive value. In a case that a collision status of the smart moving device is released, the shape of the rubber stripe at the bottom of the smart moving device is restored, so that the inner contact point is no longer in contact with the outer contact point, and in this case the signal sensed by the collision sensor is a negative value. The above description is merely an example and the collision sensor is not limited thereto.

Due to problems such as load or aging of the smart moving device or interference from a physical environment, the smart moving device may collide during movement according to the navigation strategy determined in the foregoing operation 101. In a case that the signal sensed by the collision sensor in the smart moving device is a positive value, the collision indication information acquired by the smart moving device may indicate that the smart moving device collides. In a case that the signal sensed by the collision sensor in the smart moving device is a negative value, the collision indication information acquired by the smart moving device indicates that the smart moving device does not collide.

The navigation method of the smart moving device according to an example embodiment of FIG. 1 may further include:

Operation 103: Adjust the navigation calculation function according to the collision indication information obtained in operation 102, so that the smart moving device determines the navigation strategy according to the adjusted navigation calculation function.

Specifically, the performing, by the smart moving device, the adjustment may include, but is not limited to, the following two manners:

(1) In a case that the navigation calculation function includes a product of multiplying the cost array (used for representing the environmental information) by corresponding weight information.

In a case that the collision indication information indicates that the smart moving device does not collide, at least one weight value in the weight information included in the navigation calculation function is increased. In a case that the collision indication information indicates that the smart moving device collides, at least one weight value in the weight information is reduced. Herein, the at least one weight value is a weight value for determining the navigation strategy determined in the foregoing operation 101, and a value by which a weight value is increased or reduced may be preset in the smart moving device. For example, the weight value is increased or reduced by 0.1.

For example, in the navigation calculation function, the cost array is a matrix 1 of 3×3, that is, $$\begin{bmatrix} 0, 0, 0 \\ 1, 0, 0 \\ 1, 0, 1 \end{bmatrix},$$

and the weight information is a matrix 2 of 3×1, that is, $$\begin{bmatrix} 0 \\ 1 \\ 1 \end{bmatrix},$$

and the navigation strategy indication value is a product of multiplying the matrix 1 by the matrix 2, and is a matrix 3, that is, [0,0,1]. The elements in the navigation strategy indication value respectively indicate information about moving forward, moving backward, and steering to the left, so that the smart moving device determines, according to the matrix 3, that the navigation strategy is steering to the left. In the weight information, it is determined that the weight value of the navigation strategy "steering to the left" is the weight value "1" at the third row and the first column in the matrix 2. Therefore, in a case that the collision indication information indicates that the smart moving device collides, the weight value "1" at the third row and the first column in the matrix 2 is reduced.

(2) The navigation calculation function includes a case that a first long-term expectation is a sum of current reward information and a weighting value of a second long-term expectation, that is, a case that the navigation calculation function uses the sum of the current reward information and the weighting value of the second long-term expectation as the first long-term expectation.

In this case, in a case that the collision indication information acquired by the smart moving device in the foregoing operation 102 indicates that a collision occurs, current reward information in a feedback model may be adjusted, where the feedback model includes reward information of performing any navigation strategy in any piece of environmental information. Specifically, in a case that the current reward information in the feedback model is not consistent with the information indicated by the collision indication information, the current reward information in the feedback model is adjusted to be consistent with the information indicated by the collision indication information. In a case that the current reward information is consistent with the information, the current reward information in the feedback model is kept unchanged.

For example, the current reward information, that is, an R value, in the feedback model is −1, representing that the smart moving device is approaching an obstacle, and the collision indication information indicates that a collision occurs. In this case, the current reward information is not consistent with the collision indication information, the current reward information in the feedback model needs to be changed to −2, representing that the smart moving device collides.

In a case that the collision indication information acquired by the smart moving device in the foregoing operation 102 indicates that no collision occurs, the smart moving device further needs to adjust the current reward information in the feedback model according to first indication information about whether the smart moving device is far away from an obstacle, second indication information about whether the smart moving device is approaching an obstacle or the like, the first indication information and the second indication information being acquired by a laser sensor or visual sensor included in the smart moving device. Specifically, in a case that the current reward information in the feedback model is not consistent with the information indicated by the first indication information or the second indication information, the current reward information in the feedback model is adjusted to be consistent with the information indicated by the first indication information (or the second indication information). In a case that the current reward information is consistent with the information, the current reward information in the feedback model is kept unchanged.

In a case that the navigation calculation function is another function, the smart moving device may adjust a parameter value of a constant parameter in the navigation calculation function. Herein, the parameter value of the constant parameter is a parameter that is used in determining the navigation strategy according to the navigation calculation function and to which a value does not need to be assigned at any time, and is, for example, a weight or an angle.

The foregoing operations 101 to 103 are one adjustment process of the navigation calculation function by the smart moving device. During actual application, the navigation calculation function needs to be adjusted a plurality of times according to the method in the foregoing operations 101 to 103, so that the eventually obtained navigation calculation function is an optimal navigation calculation function. After the smart moving device determines the navigation strategy according to the optimal navigation calculation function, there is no collision or a very few collisions during movement according to the determined navigation strategy.

In a specific application, after performing the foregoing operation 103, the smart moving device may further use the adjusted navigation calculation function as the preset navigation calculation function, that is, update the preset navigation calculation function according to the adjusted navigation calculation function, to facilitate subsequent cyclic adjustment. In addition, after operation 103 is performed, it may further be determined whether the adjustment of the navigation calculation function satisfies a preset stop condition (that is, an adjustment stop condition). In a case that the adjustment satisfies the preset stop condition, the adjustment of the navigation calculation function is stopped, operation 101 is no longer performed. In a case that the adjustment does not satisfy the preset stop condition, operation 101 is performed again, and after the navigation strategy is determined according to the navigation calculation function a next time, the navigation calculation function is adjusted again according to the collision indication information, to perform cyclic adjustment until the adjustment stop condition is satisfied.

The preset stop condition (that is, the adjustment stop condition) may include, but is not limited to, the following conditions: a number of times of adjusting the navigation calculation function reaches a preset number of times, the smart moving device arrives at a navigation end point, and the like. It may be understood that when initiating a procedure in an example embodiment, the smart moving device may randomly select a navigation start point and a navigation end point or may provide a user interface for selecting a navigation start point and a navigation end point for selection by a user. In this way, the smart moving device may determine, according to information about whether the smart moving device arrives at the navigation end point, whether to stop adjusting the navigation calculation function.

It may be seen that in the method in an example embodiment, the smart moving device determines the navigation strategy according to a preset navigation calculation function, and during movement according to the navigation strategy, adjusts the navigation calculation function according to the collision indication information in a case that the collision indication information of the smart moving device is acquired. In this way, during movement according to a navigation strategy determined by using a preset navigation calculation function, a smart moving device may continuously adjust the navigation calculation function according to a collision status of the smart moving device. Accordingly, there is no collision or a very few collisions during movement according to the navigation strategy determined by using the adjusted navigation calculation function. The method in an example embodiment of the disclosure is applicable to a smart moving device having any navigation calculation function and is applicable to the movement of the smart moving device in any environment.

The method of operations 101 to 103 in the foregoing example embodiment is mainly adjusting the navigation calculation function according to the collision indication information acquired by the smart moving device during movement. Such an adjustment method is relatively simple. In another example embodiment, to adjust the navigation calculation function more precisely, the smart moving device may further adjust the navigation calculation function by using the collision indication information in combination with another parameter. In an example, before performing the foregoing operation 103, in a case that the collision indication information indicates that the smart moving device collides, the smart moving device may further acquire position information indicating positions where the smart moving device collides. The position information may be obtained through scanning by a visual sensor or laser sensor included in the smart moving device.

In this way, when performing the adjustment operation in the foregoing operation 103, the smart moving device adjusts the navigation calculation function according to the position information and the collision indication information.

There may be a case that in the environmental information acquired in the foregoing operation 101, a position corresponding to the position information is not occupied by an obstacle, but the collision indication information indicates that the smart moving device collides, leading to an inconsistency between the position information and the collision indication information. The case may occur when, after the smart moving device acquires the environmental information, at a corresponding position in the environment, an obstacle that temporarily appears or there is a moving object (for example, a pedestrian or a moving vehicle). In this way, when determining the navigation strategy, the smart moving device does not consider an obstacle at the position. As a result, the smart moving device collides during movement according to the navigation strategy, but the reason for the collision is not because the navigation strategy is inaccurate due to an imprecise navigation calculation function. Therefore, in this case, the smart moving device does not adjust the navigation calculation function, but instead keeps the navigation calculation function unchanged.

The smart moving device may further adjust the navigation calculation function by using another collected parameter based on the smart moving device, and the another collected parameter may vary depending on embodiments.

Figure 2:
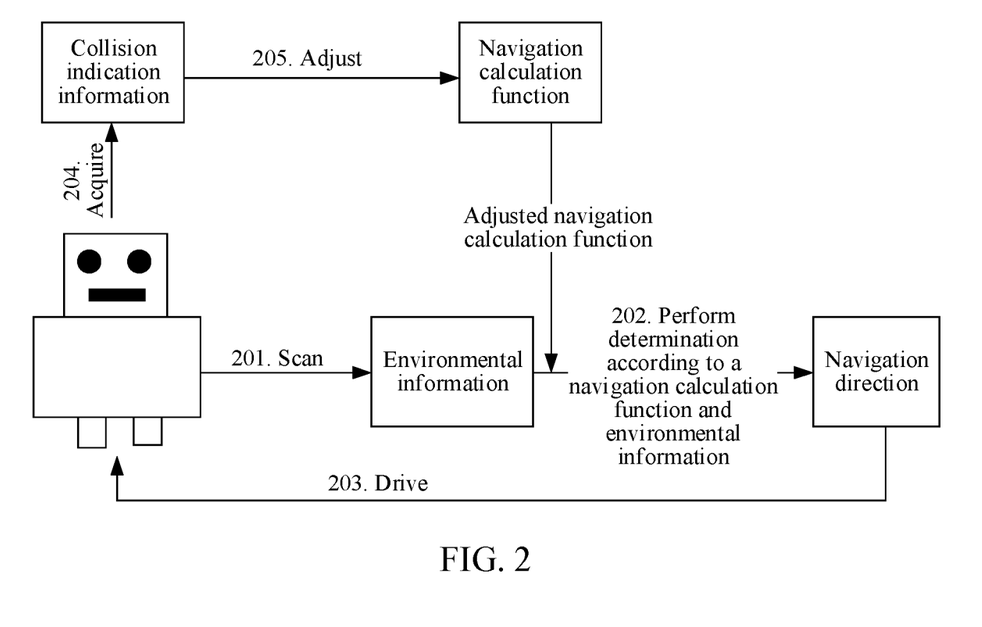
FIG. 2 is a schematic diagram of a navigation method of a robot according to an application embodiment of the disclosure.

A specific application example is used below to describe the navigation method of a smart moving device in an example embodiment of the disclosure. In an example embodiment, the smart moving device is a robot. The robot includes various sensors, that is, a visual sensor, a laser sensor, a collision sensor, and the like. A navigation strategy determined by the smart moving device may include information about a navigation direction. As shown in FIG. 2, a navigation method of the robot includes the following operations 201-205:

Operation 201: A robot uses a visual sensor or laser sensor to scan environmental information of an environment at a distance from the robot being within a preset range according to a particular period. The environmental information may include position information of positions within the range and information about whether the positions are occupied by obstacles.

Operation 202: The robot determines a cost array according to the environmental information obtained through scanning, and determines a navigation strategy according to the cost array and a preset navigation calculation function, the navigation strategy being a navigation direction.

Specifically, in an example, the robot may first use a product of multiplying the cost array by weight information as a navigation strategy indication value, the navigation strategy indication value being a navigation direction indication value. The weight information includes a plurality of weight values. The robot then determines a corresponding navigation direction according to the navigation direction indication value. The navigation direction may be information about moving forward, moving to the left front, moving to the right front, turning left, turning right, moving backward, moving to the left rear or moving to the right rear. However, this is merely an example and the navigation direction is not limited thereto.

In another example, the robot may first estimate, according to the cost array, denoted as s1, represented by the environmental information (that is, the environmental information acquired in the foregoing operation 201) acquired in a currently initiated navigation procedure, cost arrays, respectively denoted as s2, s3, s4, and s5, represented by environmental information corresponding to the robot in four subsequent consecutive calculation periods.

For a first long-term expectation value $Qci(s1)$ corresponding to a navigation strategy ci, according to the navigation strategy shown in the foregoing Formula 1, the first long-term expectation value is obtained as: $Qci(s1)=Rci|s1+r\times Qci(s2)$, $Qci(s2)=Rci|s2+r\times Qci(s3)$, ..., and the following Formula 2 may be obtained:

$$Qci(s1)=Rci|s1+r\times Rci|s2+r\times r\times Rci|s3+r\times r\times r\times Rci|s4+r\times r\times r\times r\times Rci|s5+ \quad (2)$$

In this way, according to Formula 2, for a plurality of navigation strategies c1, c2, ..., and ck, corresponding first long-term expectation values are $Qc1(s1)$, $Qc2(s1)$, ..., and $Qck(s1)$ may be respectively obtained. A navigation strategy corresponding to the largest value in the first long-term expectation values $Qc1(s1)$, $Qc2(s1)$, ..., and $Qck(s1)$ may be finally selected as the navigation strategy of the robot.

Operation 203: The robot drives the movement of the robot according to the determined navigation direction.

Operation 204: During the movement of the robot, acquire collision indication information by using a collision sensor of the robot.

Operation 205: The robot adjusts the navigation calculation function according to the collision indication information.

Specifically, in a case that the preset navigation calculation function includes using a product of multiplying the cost array by weight information as the navigation strategy indication value, at least one weight value in the weight information of the navigation calculation function is increased in a case that the collision indication information indicates that the robot does not collide, and at least one weight value in the weight information is reduced in a case that the collision indication information indicates that the robot collides. The at least one weight value is a weight value for determining the navigation direction determined in the foregoing operation 202.

In a case that the navigation calculation function includes a first long-term expectation that is a sum of current reward information and a weighting value of a second long-term expectation, current reward information in a feedback model is adjusted in a case that the collision indication information indicates that the robot collides, and the feedback model includes reward information of performing any navigation strategy in any piece of environmental information. In a case that the collision indication information indicates that the robot does not collide, the current reward information in the feedback model is adjusted according to first indication information about whether the robot is far away from an obstacle or second indication information about whether the robot is approaching an obstacle, the first indication information and the second indication information being acquired by the robot.

After the navigation calculation function is adjusted, in a case that the robot performs scanning again to obtain environmental information of an environment in which the robot is located in a next period, the robot performs the foregoing operations 202 to 205 based on the adjusted navigation calculation function. In this way, the foregoing operations 201 to 203 may be repeated to obtain one optimal navigation calculation function.

Figure 3:
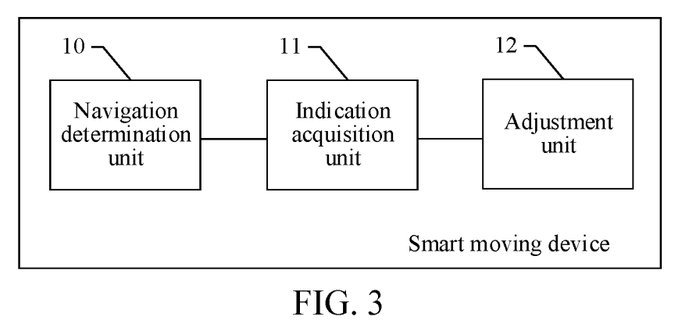
FIG. 3 is a schematic structural diagram of a smart moving device according to an example embodiment of the disclosure.

An example embodiment of the disclosure further provides a smart moving device, for example, a robot. A schematic structural diagram of the robot is shown in FIG. 3. The robot may include a navigation determination unit 10, an indication acquisition unit 11, and an adjustment unit 12.

The navigation determination unit 10 is configured to determine a navigation strategy of the smart moving device according to a preset navigation calculation function. Herein, the navigation strategy may be information about a navigation direction, information for performing navigation driving on the smart moving device, and/or the like.

In an example embodiment, the navigation determination unit 10 is configured to: acquire environmental information of an environment in which the smart moving device is located, the environmental information being used for representing whether positions in an environment at a distance from the smart moving device being within a preset range are occupied by obstacles; and determine the navigation strategy of the smart moving device according to the environmental information and the preset navigation calculation function.

In a case that the environmental information may be represented by a cost array, the cost array includes a plurality of element values, an element value at any position in the cost array indicating whether a position in an environment in which the smart moving device is located is occupied by an obstacle.

In an example, the preset navigation calculation function is based on a product of multiplying the cost array by weight information as a navigation strategy indication value, the weight information including a plurality of weight values. During determining the navigation strategy, the navigation determination unit 10 is configured to: calculate the navigation strategy indication value according to the environmental information and the navigation calculation function, and determine the corresponding navigation strategy according to the navigation strategy indication value.

In another example, the preset navigation calculation function is based on a sum of current reward information and a weighting value of a second long-term expectation as a first long-term expectation, the first long-term expectation being a long-term expectation that the smart moving device performs a navigation strategy in current environmental information, the current reward information being used for representing a feedback after the smart moving device performs a navigation strategy in the current environmental information, and the second long-term expectation being a long-term expectation that the smart moving device performs a navigation strategy in estimated environmental information. In a case of determining the navigation strategy, the navigation determination unit 10 is configured to: determine, according to the environmental information and the preset navigation calculation function, a plurality of first long-term expectation values that separately correspond to a plurality of navigation strategies; and select the largest value in the plurality of first long-term expectation values, and determine a navigation strategy corresponding to the largest value as the navigation strategy of the smart moving device.

The indication acquisition unit 11 is configured to acquire collision indication information of the smart moving device in a case that the smart moving device moves according to the navigation strategy determined by the navigation determination unit 10.

The adjustment unit 12 is configured to adjust the navigation calculation function according to the collision indication information acquired by the indication acquisition unit 11, so that the smart moving device determines the navigation strategy according to the adjusted navigation calculation function.

In one example, the preset navigation calculation function includes: using a product of multiplying the cost array by weight information as the navigation strategy indication value. The adjustment unit 12 is configured to: increase at least one weight value in the weight information in a case that the collision indication information indicates that the smart moving device does not collide; and reduce at least one weight value in a case that the collision indication information indicates that the smart moving device collides. Herein, the at least one weight value is a weight value for determining the navigation strategy determined by the navigation determination unit 10.

In another example, the preset navigation calculation function includes: acquiring a first long-term expectation that is a sum of current reward information and a weighting value of a second long-term expectation. The adjustment unit 12 is configured to: adjust the current reward information in a feedback model in a case that the collision indication information indicates that the smart moving device collides, the feedback model including reward information of performing any navigation strategy in any piece of environmental information; and adjust the current reward information in the feedback model according to first indication information about whether the smart moving device is far away from an obstacle or second indication information about whether the smart moving device is approaching an obstacle in a case that the collision indication information indicates that the smart moving device does not collide, the first indication information and the second indication information being acquired by the smart moving device.

In the smart moving device in an example embodiment, the navigation determination unit 10 determines the navigation strategy according to a preset navigation calculation function, and during movement according to the navigation strategy, the adjustment unit 12 adjusts the navigation calculation function according to the collision indication information of the smart moving device acquired by the acquisition unit 11. In this way, during movement according to a navigation strategy determined by using a preset navigation calculation function, a smart moving device may continuously adjust the navigation calculation function according to a collision status of the smart moving device, and accordingly, there is no collision or a very few collisions during movement according to the navigation strategy determined by using the adjusted navigation calculation function.

Figure 4:
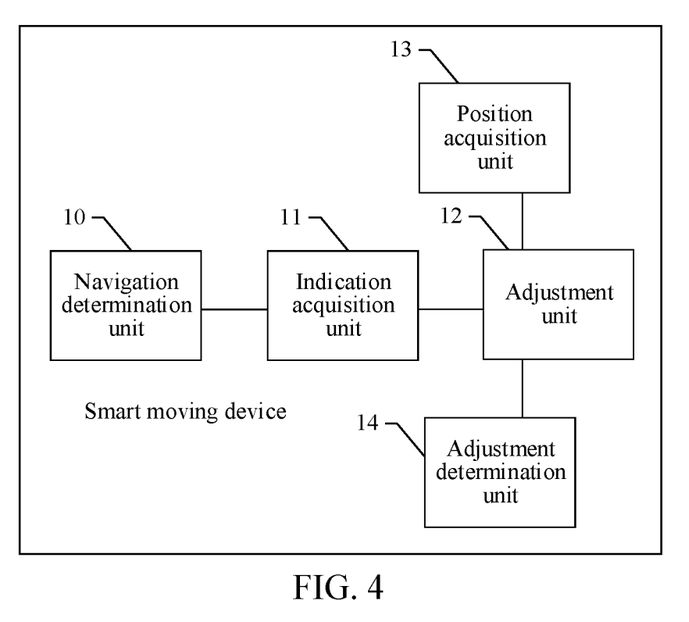
FIG. 4 is a schematic structural diagram of another smart moving device according to an example embodiment of the disclosure.

Referring to FIG. 4, in an example embodiment, in addition to the structure shown in FIG. 3, the smart moving device may further include a position acquisition unit 13 and an adjustment determination unit 14.

The position acquisition unit 13 is configured to acquire position information indicating where the smart moving device collides in a case that the collision indication information indicates that the smart moving device collides; and the adjustment unit 12 is configured to adjust a navigation calculation function according to the position information and the collision indication information. Specifically, the navigation calculation function is kept unchanged in a case that it is determined based on the acquired environmental information that a position corresponding to the position information is not occupied by an obstacle.

The adjustment determination unit 14 is configured to determine whether the adjustment of the navigation calculation function satisfies the following condition, where in a case that the condition is satisfied, the adjustment unit 12 is instructed to stop adjusting the navigation calculation function: a number of times of adjusting the navigation calculation function reaches a preset number of times, the smart moving device arrives at a navigation end point, and the like.

Figure 5:
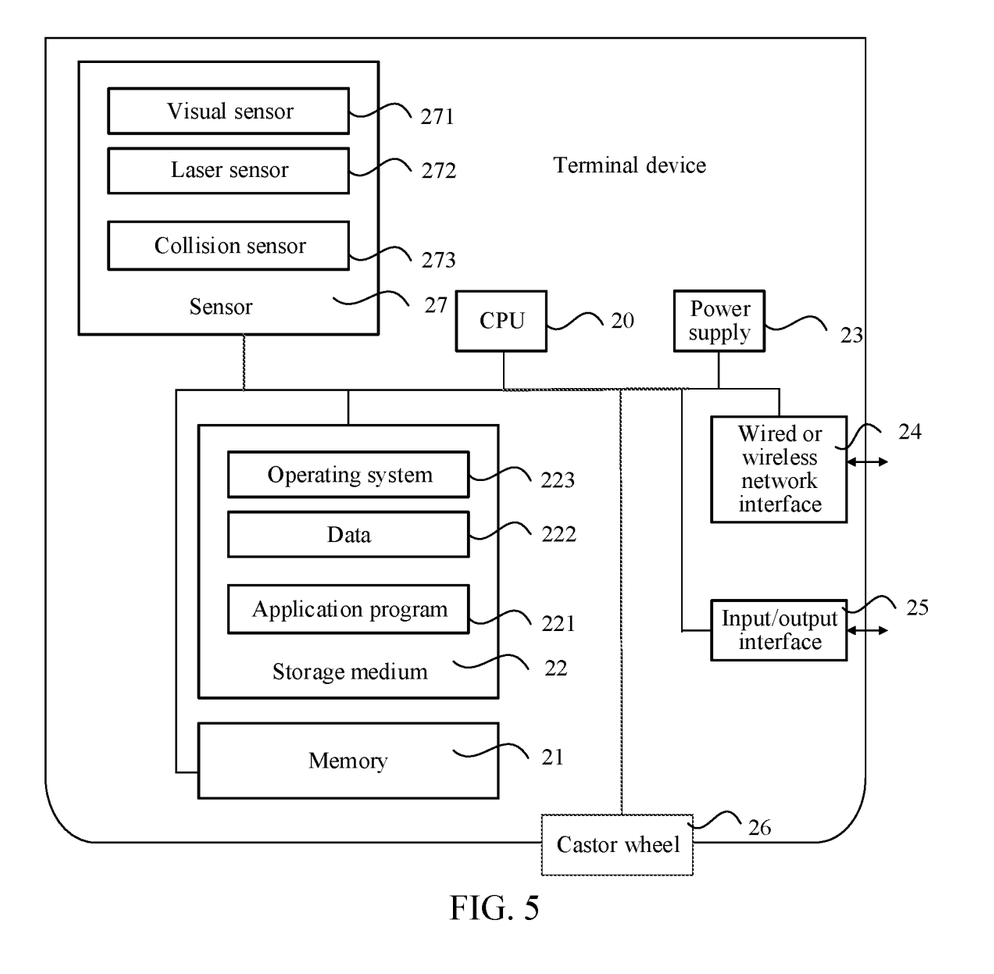
FIG. 5 is a schematic diagram of a logical structure of a terminal device according to an example embodiment of the disclosure.

An example embodiment of the disclosure further provides a terminal device. A schematic diagram of a logical structure of the terminal device is shown in FIG. 5. The terminal device may vary greatly due to different configurations or performance, and may include one or more central processing units (CPU) 20 (for example, one or more processors), a memory 21, and one or more storage media 22 (for example, one or more mass storage devices) that store application programs 221 or data 222. The memory 21 and a storage medium 22 may be transient or persistent storages. The program stored in the storage medium 22 may include one or more modules (not shown), and each module may include a series of instructions and operations for the terminal device. Further, the CPU 20 may be configured to: communicate with the storage medium 22; and perform, on the terminal device, the series of instructions and operations in the storage medium 22.

Specifically, the application program 221 stored in the storage medium 22 includes a navigation application program of the smart moving device, and the program may include the navigation determination unit 10 (or navigation determination code), the indication acquisition unit 11 (or indication acquisition code), the adjustment unit 12 (adjustment code), the position acquisition unit 13 (position acquisition code), and the adjustment determination unit 14 (adjustment determination code) that are described above in the foregoing example embodiments of the smart moving device. Details are not described herein. Further, the CPU 20 may be configured to: communicate with the storage medium 22; and perform, on the terminal device, a series of operations corresponding to the navigation application program, stored in the storage medium 22, of the smart moving device.

The terminal device may further include one or more power supplies 23, one or more wired or wireless network interfaces 24, one or more input/output interfaces 25, and/or one or more operating systems 223, for example, Windows Server™, Mac OS X™, Unix™, Linux™ or FreeBSD™.

Operations performed by the smart moving device in the foregoing method embodiment may be based on the structure of the terminal device shown in FIG. 5.

Further, in a case that the terminal device is applied to the smart moving device, the terminal device may further include a castor wheel 26. FIG. 5 is only a logic schematic structural diagram. The shape of an actual castor wheel 26 may be circular, and the castor wheel 26 is disposed at the bottom of the terminal device. The castor wheel 26 may be in communication connection with the CPU 20. The CPU 20 may drive the castor wheel 26 to spin to actuate the terminal device to perform any foregoing navigation strategy.

The terminal device further includes various sensors 27, for example, a visual sensor 271, a laser sensor 272, and a collision sensor 273. The visual sensor 271 may be disposed at the top of the terminal device. The laser sensor 272 is disposed at the bottom of the terminal device. The visual sensor 271 and the laser sensor 272 are both configured to: acquire environmental information of an environment at a distance from the terminal device being within a preset range, and transmit the environmental information to the storage medium 22 for storage.

The collision sensor 273 may be disposed on a rubber stripe at the bottom of the terminal device. The rubber stripe is elastic and is used for acquiring collision indication information of the terminal device and transmitting the collision indication information to the CPU 20.

The structure of the foregoing terminal device according to an example embodiment may be a relatively simple application, for example, a simple robot. In a case that the terminal device is applied to a relatively complex unmanned vehicle, the terminal device further includes navigation driving apparatuses such as a throttle, a brake, and a steering wheel, which are all separately connected to the CPU 20.

An example embodiment of the disclosure further provides a storage medium, the storage medium storing a plurality of instructions, the instructions being operable to be loaded by a processor to perform the navigation method of a smart moving device performed by the smart moving device.

An example embodiment of the disclosure further provides a terminal device, including a processor and a storage medium, the processor being configured to implement each instruction; and the storage medium being configured to store a plurality of instructions, the instructions being operable to be loaded by the processor to perform the navigation method of a smart moving device performed by the smart moving device.

Further, the terminal device further includes a collision sensor, the collision sensor being configured to: acquire collision indication information of the terminal device, and transmit the collision indication information to the processor.

The terminal device further includes a laser sensor, the laser sensor being configured to: acquire environmental information of an environment at a distance from the terminal device being within a preset range, and transmit the environmental information to the storage medium for storage.

A persons of ordinary skill in the art should understand that all or a part of the operations of the methods according to the example embodiments may be implemented by a program instructing relevant hardware. The program may be stored in a computer-readable storage medium, and the storage medium may include a read-only memory (ROM), a random-access memory (RAM), a magnetic disk or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

The smart moving device, the navigation method thereof, and the storage medium provided in the example embodiments of the disclosure are described in detail above. It should be understood that example embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A navigation method performed by a smart moving device, the navigation method comprising:
acquiring environmental information of an environment in which the smart moving device is located, wherein the environmental information is represented by a cost array comprising a plurality of element values respectively corresponding to a plurality of positions in the environment, and
an element value in the cost array indicates whether a position in the environment, corresponding to the element value, is occupied by an obstacle;
determining a navigation strategy according to a preset navigation calculation function and the environmental information;
acquiring collision indication information related to a collision status when the smart moving device moves according to the navigation strategy;
adjusting the preset navigation calculation function according to the collision indication information; and
updating the navigation strategy according to the adjusted navigation calculation function, wherein
the preset navigation calculation function includes a product of multiplying the cost array by a plurality of weights included in weight information, and the adjusting comprises adjusting a weight value of the plurality of weights included in the weight information based on whether the collision indication information indicating a collision; or
the preset navigation calculation function includes a sum of current reward information and a weighting value of a second long-term expectation value, and the adjusting comprises adjusting the current reward information to be consistent with information indicated by the collision indication information, wherein the current reward information represents a collision feedback after the smart moving device performs a corresponding navigation strategy based on current environmental information, and the second long-term expectation value represents an expectation that the corresponding navigation strategy is performed without the collision based on estimated environmental information.

2. The navigation method according to claim 1, wherein the updating comprises:
repeating operations of the acquiring, the adjusting the preset navigation calculation function, and the updating until an adjustment stop condition is satisfied.

3. The navigation method according to claim 1, wherein the determining comprises: determining a navigation strategy indication value based on the product of multiplying the cost array by the plurality of weights included in the weight information, and determining the navigation strategy according to the navigation strategy indication value; and
the adjusting the preset navigation calculation function comprises: increasing at least one weight value of the plurality of weights included in the weight information based on the collision indication information indicating an absence of the collision, and reducing at least one weight value of the plurality of weights included in the weight information based on the collision indication information indicating an occurrence of the collision.

4. The navigation method according to claim 1, wherein the determining comprises:
determining a plurality of first long-term expectation values, each based on the sum of the current reward information and the weighting value of the second long-term expectation value, the plurality of first long-term expectation values separately corresponding to a plurality of navigation strategies and representing an expectation that the corresponding navigation strategy is performed without the collision based on the current environmental information; and
selecting a largest value among the plurality of first long-term expectation values, and determining a first navigation strategy corresponding to the largest value as the navigation strategy of the smart moving device.

5. The navigation method according to claim 4, wherein the adjusting the preset navigation calculation function comprises:
adjusting current reward information of performing the first navigation strategy corresponding to the largest value in a feedback model, the feedback model comprising reward information of performing any navigation strategy based on any piece of environmental information, the adjusting the current reward information being based on at least one of the followings:
information indicating whether the collision occurs when the smart moving device performs the first navigation strategy;
information indicating whether the smart moving device is away from the obstacle by a certain distance or greater; and
whether the smart moving device is approaching the obstacle.

6. The navigation method according to claim 1, wherein the determined navigation strategy includes a navigation direction and/or information for performing navigation driving on the smart moving device.

7. The navigation method according to claim 1, further comprising, prior to the adjusting the preset navigation calculation function:
acquiring position information indicating positions in which the collision occurs, in response to the collision indication information indicating that the collision occurs when the smart moving device moves according to the navigation strategy; and
the adjusting the preset navigation calculation function comprises: adjusting the preset navigation calculation function according to the position information and the collision indication information.

8. The navigation method according to claim 7, wherein the adjusting the preset navigation calculation function comprises:
maintaining the preset navigation calculation function unchanged in response to a determination that a position corresponding to the position information is not occupied by an obstacle.

9. The navigation method according to claim 2, wherein the adjustment stop condition comprises at least one of: a number of times of adjusting the preset navigation calculation function reaches a preset number of times, and the smart moving device arrives at a navigation end point.

10. A smart moving device, comprising:
at least one memory configured to store program code; and
at least one processor configured to read the program code and operate as instructed by the program code, the program code comprising:
environmental information acquisition code configured to cause at least one of the at least one processor to acquire environmental information of an environment in which the smart moving device is located, wherein
the environmental information is represented by a cost array comprising a plurality of element values respectively corresponding to a plurality of positions in the environment, and
an element value in the cost array indicates whether a position in the environment, corresponding to the element value, is occupied by an obstacle;
navigation determination code configured to cause at least one of the at least one processor to determine a navigation strategy according to a preset navigation calculation function and the environmental information;
indication acquisition code configured to cause at least one of the at least one processor to acquire collision indication information related to a collision status when the smart moving device moves according to the navigation strategy;
adjustment code configured to cause at least one of the at least one processor to adjust the preset navigation calculation function according to the collision indication information; and
updating code configured to update the navigation strategy according to the adjusted navigation calculation function, wherein
the preset navigation calculation function includes a product of multiplying the cost array by a plurality of weights included in weight information, and the adjustment code causes at least one of the at least one processor to adjust a weight value of the plurality of weights included in the weight information based on whether the collision indication information indicating a collision; or
the preset navigation calculation function includes a sum of current reward information and a weighting value of a second long-term expectation value, and the adjustment code causes at least one of the at least one processor to adjust the current reward information to be consistent with information indicated by the collision indication information, wherein the current reward information represents a collision feedback after the smart moving device performs a corresponding navigation strategy based on current environmental information, and the second long-term expectation value represents an expectation that the corresponding navigation strategy is performed without the collision based on estimated environmental information.

11. The smart moving device according to claim 10, wherein
the navigation determination code further causes at least one of the at least one processor to determine a navigation strategy indication value based on the product of multiplying the cost array by the plurality of weights included in the weight information, and determine the navigation strategy according to the navigation strategy indication value; and
the adjustment code further causes at least one of the at least one processor to increase at least one first weight value, among the plurality of weights included in the weight information, based on the collision indication information indicating an absence of the collision, and reduce at least one second weight value, among the plurality of weights included in the weight information, based on the collision indication information indicating an occurrence of the collision.

12. The smart moving device according to claim 10, wherein
the navigation determination code further causes at least one of the at least one processor to:
determine a plurality of first long-term expectation values, each based on the sum of the current reward information and the weighting value of the second long-term expectation value, the plurality of first long-term expectation values separately corresponding to a plurality of navigation strategies and representing an expectation that the corresponding navigation strategy is performed without the collision based on the current environmental information, the current reward information representing a collision feedback after the smart moving device performs the corresponding navigation strategy based on the current environmental information, and the second long-term expectation value representing an expectation that the corresponding navigation strategy is performed without the collision based on estimated environmental information; and
select a largest value among the plurality of first long-term expectation values, and determining a first navigation strategy corresponding to the largest value as the navigation strategy of the smart moving device.

13. A non-transitory storage medium, the storage medium storing a plurality of instructions to be loaded by at least one processor to perform a navigation method, performed by a smart moving device, the navigation method comprising:
acquiring environmental information of an environment in which the smart moving device is located, wherein
the environmental information is represented by a cost array comprising a plurality of element values respectively corresponding to a plurality of positions in the environment, and
an element value in the cost array indicates whether a position in the environment, corresponding to the element value, is occupied by an obstacle;
determining a navigation strategy according to a preset navigation calculation function and the environmental information;
acquiring collision indication information related to a collision status when the smart moving device moves according to the navigation strategy;
adjusting the preset navigation calculation function according to the collision indication information; and
updating the navigation strategy according to the adjusted navigation calculation function, wherein
the preset navigation calculation function includes a product of multiplying the cost array by a plurality of weights included in weight information, and the adjusting comprises adjusting a weight value of the plurality of weights included in the weight information based on whether the collision indication information indicating a collision; or
the preset navigation calculation function includes a sum of current reward information and a weighting value of a second long-term expectation value, and the adjusting comprises adjusting the current reward information to be consistent with information indicated by the collision indication information, wherein the current reward information represents a collision feedback after the smart moving device performs a corresponding navigation strategy based on current environmental information, and the second long-term expectation value represents an expectation that the corresponding navigation strategy is performed without the collision based on estimated environmental information.

14. A terminal device, comprising at least one processor and a storage medium,
the storage medium being configured to store a plurality of instructions to be loaded by the at least one processor to perform the navigation method of a smart moving device according to claim 1.

15. The terminal device according to claim 14, wherein the terminal device further comprises a collision sensor; and
the collision sensor is configured to: acquire the collision indication information, indicating whether the collision occurs in the terminal device, and transmit the collision indication information to the at least one processor.

16. The terminal device according to claim 14, wherein the terminal device further comprises a laser sensor, and the laser sensor is configured to: acquire environmental information of an environment at a distance from the terminal device being within a preset range, and transmit the environmental information to the storage medium to be stored.

* * * * *